(12) United States Patent
Kryzman et al.

(10) Patent No.: US 10,479,896 B2
(45) Date of Patent: Nov. 19, 2019

(54) ANTI-CORROSION AND/OR PASSIVATION COMPOSITIONS FOR METAL-CONTAINING SUBSTRATES AND METHODS FOR MAKING, ENHANCING, AND APPLYING THE SAME

(71) Applicant: Goodrich Corporation, Charlotte, NC (US)

(72) Inventors: Michael A. Kryzman, West Hartford, CT (US); Georgios S. Zafiris, Glastonbury, CT (US); Mark R. Jaworowski, Glastonbury, CT (US); Weilong Zhang, Glastonbury, CT (US); Roque Panza-Giosa, Oakville (CA); Marilea Manzini, Maple (CA)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 16/281,354

(22) Filed: Feb. 21, 2019

(65) Prior Publication Data

US 2019/0185680 A1 Jun. 20, 2019

Related U.S. Application Data

(62) Division of application No. 15/041,894, filed on Feb. 11, 2016, now Pat. No. 10,253,189.

(51) Int. Cl.
| | | |
|---|---|---|
| *C09D 5/08* | (2006.01) |
| *C23F 11/08* | (2006.01) |
| *C23F 11/12* | (2006.01) |
| *C23F 11/14* | (2006.01) |
| *C08K 3/32* | (2006.01) |
| *C08K 3/24* | (2006.01) |
| *C08K 3/34* | (2006.01) |
| *C08K 5/098* | (2006.01) |
| *C08K 13/02* | (2006.01) |
| *C08K 3/22* | (2006.01) |

(52) U.S. Cl.
CPC .............. *C09D 5/086* (2013.01); *C09D 5/082* (2013.01); *C09D 5/084* (2013.01); *C23F 11/08* (2013.01); *C23F 11/124* (2013.01); *C23F 11/147* (2013.01); *C08K 3/24* (2013.01); *C08K 3/34* (2013.01); *C08K 5/098* (2013.01); *C08K 13/02* (2013.01); *C08K 2003/2296* (2013.01); *C08K 2003/321* (2013.01); *C08K 2003/327* (2013.01); *C08K 2201/014* (2013.01)

(58) Field of Classification Search
CPC ............................... C09D 5/084; C09D 5/086
See application file for complete search history.

(56) References Cited

U.S. PATENT DOCUMENTS

| | | |
|---|---|---|
| 8,268,404 B2 | 9/2012 | Vandermeulen et al. |
| 8,758,876 B2 | 6/2014 | Carcagno et al. |
| 9,200,166 B2 | 12/2015 | Zhang et al. |
| 9,399,714 B2 | 7/2016 | Zhang |
| 2004/0092637 A1 | 5/2004 | McClanahan |
| 2012/0288700 A1 | 11/2012 | McMullin |
| 2015/0159039 A1 | 6/2015 | Croutxe-Barghorn et al. |
| 2015/0167706 A1 | 6/2015 | Legros et al. |
| 2015/0274984 A1 | 10/2015 | Zhang et al. |
| 2015/0274985 A1 | 10/2015 | Zhang et al. |

FOREIGN PATENT DOCUMENTS

WO 2008090411 7/2008

OTHER PUBLICATIONS

EP Search Report dated Jun. 13, 2017 in EP Application No. 17155825.7.
USPTO; Restriction Requirement Office Action dated Jul. 27, 2017 in U.S. Appl. No. 15/041,894.
USPTO; Non-Final Office Action dated Dec. 8, 2017 in U.S. Appl. No. 15/041,894.
USPTO; Final Office Action dated Jul. 5, 2018 in U.S. Appl. No. 15/041,894.
USPTO; Non-Final Office Action dated Sep. 26, 2018 in U.S. Appl. No. 15/041,894.
USPTO; Notice of Allowance dated Nov. 28, 2018 in U.S. Appl. No. 15/041,894.

*Primary Examiner* — Peter F Godenschwager
(74) *Attorney, Agent, or Firm* — Snell & Wilmer, L.L.P.

(57) ABSTRACT

A corrosion inhibition composition is disclosed comprising a zinc oxide, a zinc phosphate, a calcium silicate, an aluminum phosphate, a zinc calcium strontium aluminum orthophosphate silicate hydrate, a molybdate compound, a silicate compound, and a zinc phthalate compound.

2 Claims, 3 Drawing Sheets

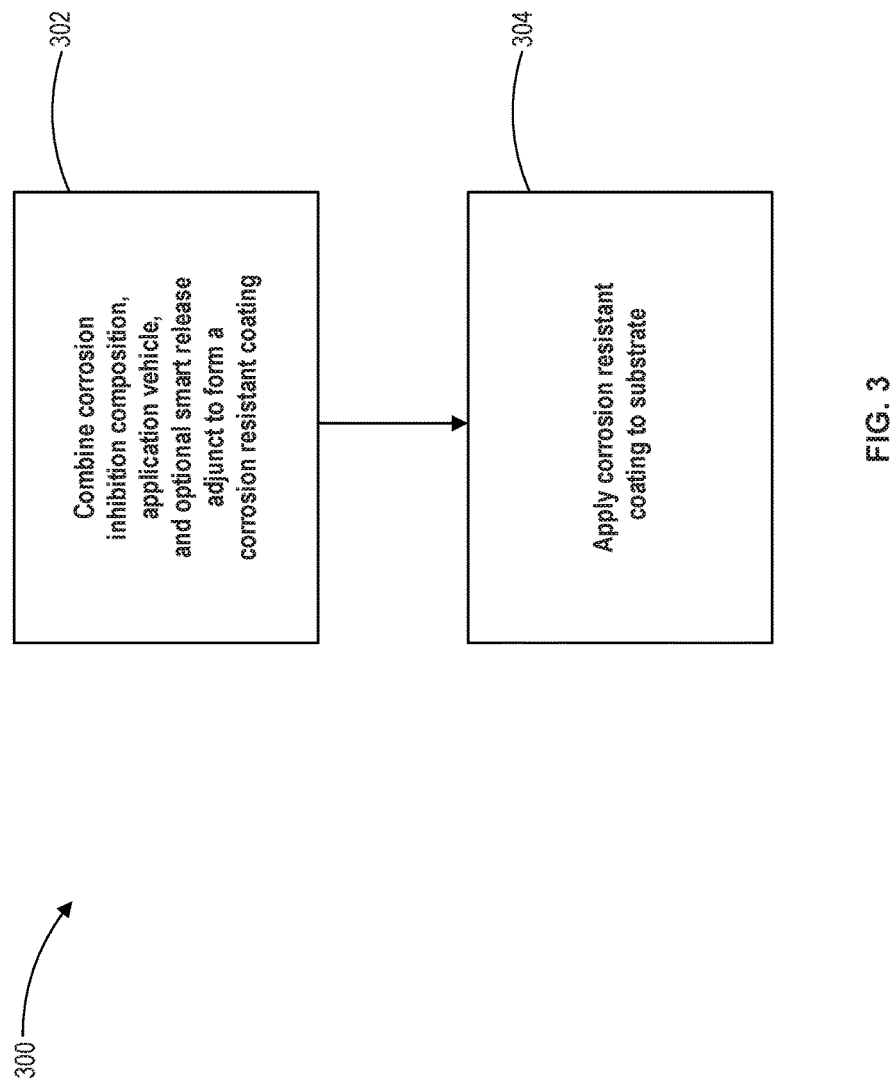

ANTI-CORROSION AND/OR PASSIVATION COMPOSITIONS FOR METAL-CONTAINING SUBSTRATES AND METHODS FOR MAKING, ENHANCING, AND APPLYING THE SAME

CROSSREFERENCE TO RELATED APPLICATIONS

This application is a divisional of, and claims priority to and the benefit of, U.S. Ser. No. 15/041,894 filed Feb. 11, 2016 and entitled "ANTI-CORROSION AND/OR PASSIVATION COMPOSITIONS FOR METAL-CONTAINING SUBSTRATES AND METHODS FOR MAKING, ENHANCING, AND APPLYING THE SAME," which is hereby incorporated herein in its entirety for all purposes.

BACKGROUND

Conventionally, high-performance post-treatments for metal and metal coated or plated substrates are based on hexavalent chromate chemistry. Metal coated substrates may include, for example, zinc-nickel electroplated coatings on high strength low alloy steel. Hexavalent chromium is highly toxic and a known carcinogen.

SUMMARY

Various compositions, systems, and methods are disclosed herein. In various embodiments, a corrosion inhibition composition is disclosed which may comprise a zinc oxide, a zinc phosphate, a calcium silicate, an aluminum phosphate, a zinc calcium strontium aluminum orthophosphate silicate hydrate, a molybdate compound, a silicate compound, and/or a zinc phthalate compound. The zinc phthalate compound may comprise at least one of a nitrophthalate zinc salt or a phthalic acid zinc salt. The molybdate compound may comprise a zinc molybdate compound. The molybdate compound may comprise $ZnMoO_4$, $CaMoO_4$, and/or $MgMoO_4$. The molybdate compound may comprise less than 4% by weight of sodium. The silicate compound may comprise a magnesium silicate compound. The silicate compound may comprise $MgSiO_3$, $ZnSiO_3$, and/or $CaSiO_3$. The corrosion inhibition composition may comprise an application vehicle comprising an epoxy, a polyurethane, an alkyd, a polysulfide, a silicone, an acrylic, and/or butadiene. The corrosion inhibition composition may comprise a smart release adjunct comprising nicotinic acid, a salt of nicotinic acid, $MgC_2O_4$, $Na_2WO_4$, $CaWO_4$, and/or a mixture of $MgSiO_3$ and $ZnMoO_4$.

In various embodiments, the molybdate compound and/or the silicate compound may comprise between 10% and 90% by weight of the corrosion inhibition composition. In various embodiments, the zinc oxide, zinc phosphate, calcium silicate, aluminum phosphate, zinc calcium strontium aluminum orthophosphate silicate hydrate, collectively, may comprise between 10% and 90% of the corrosion inhibition composition. In various embodiments, the zinc oxide, the zinc phosphate, the calcium silicate, the aluminum phosphate, and the zinc calcium strontium aluminum orthophosphate silicate hydrate, collectively, may comprise 33% by weight of the corrosion inhibition composition, the molybdate compound may comprise 33% by weight of the corrosion inhibition composition, and the silicate compound may comprise 33% by weight of the corrosion inhibition composition. In various embodiments, the zinc phthalate compound may comprise between approximately 0.001% and 5% by weight of the corrosion inhibition composition. In various embodiments, the zinc oxide, the zinc phosphate, the calcium silicate, the aluminum phosphate, and the zinc calcium strontium aluminum orthophosphate silicate hydrate, collectively, may comprise between 32% and 34% by weight of the corrosion inhibition composition, the molybdate compound may comprise between 32% and 34% by weight of the corrosion inhibition composition, and the silicate compound may comprise between 32% and 34% by weight of the corrosion inhibition composition.

In various embodiments, a corrosion resistant coating may comprise a corrosion inhibition composition and an application vehicle. The corrosion inhibition composition may comprise a zinc oxide, a zinc phosphate, a calcium silicate, an aluminum phosphate, a zinc calcium strontium aluminum orthophosphate silicate hydrate, a molybdate compound, a silicate compound, and/or a zinc phthalate compound. In various embodiments, the corrosion resistant coating may comprise between 1% and 40% Pigment Volume Concentration (PVC) corrosion inhibition composition. In various embodiments, a corrosion resistant coating may comprise between 15% and 24% PVC corrosion inhibition composition.

In various embodiments, a method of disposing a corrosion resistant coating to a substrate may comprise forming the corrosion resistant coating by combining a corrosion inhibition composition, an application vehicle, and a smart release adjunct and applying the corrosion resistant coating to the substrate. The corrosion inhibition composition may comprise a zinc oxide, a zinc phosphate, a calcium silicate, an aluminum phosphate, a zinc calcium strontium aluminum orthophosphate silicate hydrate, a molybdate compound, a silicate compound, and/or a zinc phthalate compound. The zinc phthalate compound may comprise a nitrophthalate zinc salt and/or a phthalic acid zinc salt.

BRIEF DESCRIPTION OF THE DRAWINGS

FIG. 3 illustrates a method of application of corrosion inhibition compositions in accordance with various embodiments.

DETAILED DESCRIPTION

Figure 1A:
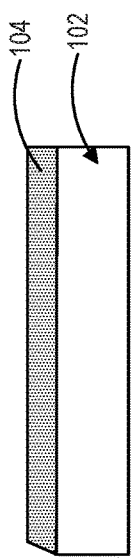
FIGS. 1A and 1B illustrate a corrosion inhibition composition coated on substrates in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical, chemical, and/or mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Corrosion inhibition compositions used on metal and metal coated substrates are used in many industries. For example, aircraft landing gear often contains metal-coated substrates in landing gear components, which may be overcoated with a corrosion inhibition composition. Metal and/or metal-coated substrates are also used in other contexts, such as in other vehicles such as automobiles, trains, and heavy equipment. In addition, metal coated substrates are found in construction contexts, such as used on building infrastructures.

As used herein, a "substrate" may include any metal and/or metal coated material. For example, a substrate may comprise iron, coated iron, steel, coated steel, stainless steel, coated stainless steel, nickel, coated nickel, aluminum, coated aluminum, bronze, coated bronze, copper beryllium, coated copper beryllium, zinc, and/or coated zinc. In various embodiments, stainless steel may comprise a high strength stainless steel such as 15-5 PH. In various embodiments, a substrate may comprise a chromium-nickel-tungsten martensitic alloy (also known as Greek Ascoloy). In various embodiments, steel may comprise a high strength low-alloy steel such as 4340 or 300M. In various embodiments, a substrate may comprise a metal that is coated with another material. A coating may be applied by electroplating, cold spraying or other suitable methods. Coatings may comprise one or more metals, such as nickel (Ni), zinc (Zn), cadmium (Cd), titanium (Ti) and combinations thereof. For example, in various embodiments, a substrate may comprise a coated steel or low alloy steel (e.g., 300M steel) comprising a Zn—Ni coating, optionally trivalent chromium coating process (TCP) or other conversion coating overcoated. In various embodiments, a substrate may comprise a coated steel or low alloy steel comprising a cadmium (Cd) and/or a titanium-cadmium (TiCd) coating, optionally chromate conversion coating (CCC) overcoated. In various embodiments, a substrate may comprise a zinc alloy and/or a TCP coated zinc, or zinc-nickel, alloy. In various embodiments, a substrate may comprise a coated steel comprising a zinc coating, and/or galvanized steel. In various embodiments, a substrate may comprise bare steel, and/or bare stainless steel. In various embodiments, a substrate may comprise aluminum-nickel-bronze alloys and/or copper alloys. In various embodiments, a substrate may comprise aluminum and aluminum alloys.

White rust is a form of corrosion product that may affect substrates comprising zinc. For example, white rust may affect bare zinc and/or metals coated with zinc containing materials, such as Zn—Ni coated or plated steel, since the former functions as a sacrificial coating that protects a steel substrate from corroding. Exposure to water and carbon dioxide may cause zinc oxide and/or zinc hydroxide to form, which may be referred to as white rust, eventually leaving the steel substrate unprotected against corrosion. To aid in preventing this form of corrosion and/or to promote surface passivation, among other things, it may be beneficial to coat a substrate with a corrosion inhibition composition. This corrosion inhibiting composition may also protect the substrate at scratched or damaged areas, and/or areas where the sacrificial coating has failed.

A corrosion inhibition composition may comprise one or more materials that inhibit at least one form of corrosion of a substrate and/or promote surface passivation of a substrate. In various embodiments, a corrosion inhibition composition may comprise one or more constituent species that may be referred to as pigments or corrosion inhibition constituents. In various embodiments, the corrosion inhibition constituents may combine in a synergistic manner to help prevent corrosion of a substrate and/or promote surface passivation of a substrate.

A corrosion inhibition composition may be mixed with an application vehicle to aid the application of the corrosion inhibition composition to a substrate. An application vehicle may comprise one or more materials and/or a solvent that aid in the dispersing and/or application of a corrosion inhibition composition to a substrate. The material(s) in an application vehicle may be referred to as an application vehicle solid(s). For example, an application vehicle solid comprised in an application vehicle may include an organic resin matrix. In various embodiments, organic resin matrices used in application vehicles may include, without limitation, one or more of an epoxy, a polyurethane, an alkyd, a polysulfide, a silicone, an acrylic, or butadiene. Solvents comprised in an application vehicle may be organic or inorganic. In that regard, the corrosion inhibition composition with an application vehicle, and with or without a smart release adjunct, as described herein, may be referred to as a corrosion resistant coating.

As further described herein, the efficacy of the corrosion inhibition constituents is related to their solubilities. The higher solubility, the better inhibition the corrosion inhibition constituents tend to offer. However, using a high solubility corrosion inhibition constituent in corrosion resistant coatings may produce other issues in corrosion resistant coating application, such as formation of blistering, or a lack of long-term corrosion protection performance. Thus, a sparingly soluble corrosion inhibition composition may be beneficial. For example, in accordance with various embodiments, a corrosion inhibition composition may have a solubility of between 0.1 and 20 millimolar (mM) (where 1 mM=$10^{-3}$ mol/L), between 0.5 mM and 15 mM, and/or between 1 mM and 10 mM.

In that regard, a smart release adjunct may be used to enhance corrosion inhibition constituent, such as molybdate compound, solubility in corrosion inhibition compositions. A smart release adjunct may be any material that regulates the solubility of a corrosion inhibition constituent.

In various embodiments, a corrosion inhibition composition may regulate the corrosion current of a substrate in water and/or in sodium chloride water solution to values at or below those achieved with a saturated strontium chromate solution, with or without the presence of dissolved oxygen. In addition, a corrosion inhibition composition may maintain an open circuit potential (OCP) relationship of steel more cathodic than Cd, TiCd, and plated Zn alloys and/or maintain a corrosion current of Cd, TiCd and Zn alloy plating greater than steel. Substances such as silicate, molybdate and tungstate compounds tend to inhibit corrosion while elevating the open circuit potential of metals to differing degrees. Compounds such as rare earth metal cations, phosphates (such as zinc phosphate), benzoate, orthophosphates, phthalates, and/or salts of phthalic acid compounds inhibit corrosion while depressing the open circuit potential. In addition, corrosion inhibition compositions and corrosion inhibition organic coatings, in accordance with various embodiments, tend to preserve the galvanic relationship between zinc nickel and steel, where zinc nickel is sacrificial to steel, where the substrate is steel coated with (e.g., plated with) zinc nickel.

Figure 1B:
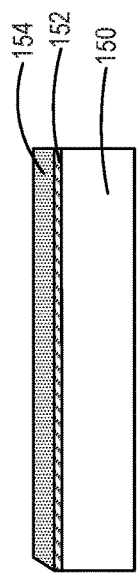

With reference to FIG. 1A, substrate 102 is shown coated with corrosion inhibition composition 104. With reference to FIG. 1B, substrate 150 is shown having coating 152. Coating 152 may comprise Zn and/or Ni, and/or Cd or TiCd, with or without TCP and/or CCC conversion coating overcoat. Substrate 150 is also shown coated with a corrosion inhibition composition 154.

In various embodiments, a corrosion inhibition composition may comprise an inorganic constituent and an organic constituent, which at times is referred to herein as an organic additive. The organic additive may comprise a zinc phthalate compound, such as a nitrophthalate zinc salt (e.g., $Zn^{2+}$ $(C_8H_3NO_6)^{2-}$) and/or a phthalic acid zinc salt (e.g., $Zn^{2+}$ $(C_8H_4O_4)^{2-}$). Surprisingly, the inclusion of the organic additive to the inorganic constituent in the corrosion inhibition composition demonstrates a synergistic effect in providing better corrosion protection than a corrosion inhibition composition comprising the inorganic constituent without the organic additive. Certain corrosion inhibition compositions that include an inorganic constituent and an organic additive demonstrate a synergetic effect with respect to corrosion resistance, and more particularly to corrosion current density, relative to a corrosion inhibition composition that comprises an inorganic constituent but not an organic additive, the organic additive comprising one or more zinc phthalate compounds.

As depicted in TABLE 1, corrosion current between substrate electrodes of the same size was measured in the inhibited electrolyte under an externally imposed potential difference ranging between 0 mV and 200 mV. Corrosion inhibition compositions were screened for inhibition by comparing steady state corrosion current at an inhibitor saturation level in a typical electrolyte (e.g. 350 ppm NaCl) versus the un-inhibited electrolyte control and the chromated inhibitor baseline (e.g. $SrCrO_4$). Corrosion current density was determined over various samples of TCP/ZnNi-plated steel. One sample of TCP/ZnNi-plated steel had no corrosion inhibition composition (i.e., it was "bare"). One sample of TCP/ZnNi-plated steel had a chromated inhibitor (e.g. $SrCrO_4$). One sample of TCP/ZnNi-plated steel had a corrosion inhibition composition comprising about 33% by weight, collectively, zinc oxide, zinc phosphate, calcium silicate, aluminum phosphate, zinc calcium strontium aluminum orthophosphate silicate hydrate, about 33% by weight zinc molybdate compound, and about 33% by weight magnesium silicate ($MgSiO_3$) compound. One sample of TCP/ZnNi-plated steel had a corrosion inhibition composition comprising about 32% by weight, collectively, zinc oxide, zinc phosphate, calcium silicate, aluminum phosphate, zinc calcium strontium aluminum orthophosphate silicate hydrate, about 32% by weight zinc molybdate compound, about 32% by weight a magnesium silicate ($MgSiO_3$) compound, and about 3.2% by weight a zinc phthalate compound (a nitrophthalate zinc salt, specifically, zinc-5-nitroisophthalate, pictured below in DIAGRAM 1). One sample of TCP/ZnNi-plated steel had a corrosion inhibition composition comprising about 32% by weight, collectively, zinc oxide, zinc phosphate, calcium silicate, aluminum phosphate, zinc calcium strontium aluminum orthophosphate silicate hydrate, about 32% by weight zinc molybdate compound, about 32% by weight magnesium silicate ($MgSiO_3$) compound, and about 3.2% by weight a zinc phthalate compound (phthalic acid zinc salt, pictured below in DIAGRAM 2). As used in this context, the term "about" only refers to plus or minus 1% by weight. As used herein, the term "% wt" or "% by weight," used in reference to a corrosion inhibition composition, may refer to the percentage weight of a corrosion inhibition constituent or a group of corrosion inhibition constituents, over the weight of the entire corrosion inhibition composition. For the avoidance of doubt, the weight of the entire corrosion inhibition composition in % wt does not include the weight of any application vehicle and/or smart release adjunct used in a corrosion resistant coating, unless explicitly stated.

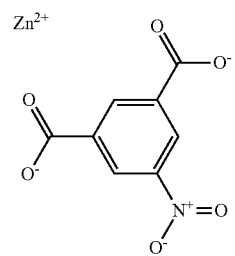

DIAGRAM 1

DIAGRAM 2

The below table, TABLE 1, summarizes the corrosion current density measurements. Lower corrosion current density is associated with increased ability to inhibit corrosion.

TABLE 1

| Pigment Blend Formulation | Corrosion current density ($\mu A/cm^2$) for TCP/ZiNi-plated steel | | |
|---|---|---|---|
| | No organic additive | Nitrophthalate zinc salt additive | Phthalic acid zinc salt additive |
| Combined zinc oxide, zinc phosphate, calcium silicate, aluminum phosphate, and zinc calcium strontium aluminum orthophosphate silicate hydrate, zinc molybdate compound, and magnesium silicate ($MgSiO_3$) | Run 1: 0.0578 Run 2: 0.1340 | Run 1: 0.0357 Run 2: 0.0370 | Run 1: 0.0280 Run 2: 0.0460 |
| Strontium Chromate (baseline) | 0.05 | — | — |
| 350 ppm NaCl (control) | 0.2 | — | — |

As shown in TABLE 1, the corrosion inhibition composition with no organic additive exhibited higher corrosion current densities than the corrosion inhibition compositions with the zinc phthalate compounds as organic additives. In general, the smaller the corrosion current density, the better the corrosion inhibition composition is functioning to prevent corrosion. A more effective corrosion inhibition composition will inhibit spontaneous electrochemical reactions between materials, thus, preventing corrosion. Accordingly, the corrosion inhibition composition comprising a zinc phthalate compound additive more effectively inhibits corrosion than the corrosion inhibition composition without a zinc phthalate compound additive.

A corrosion inhibition composition may, in various embodiments, comprise a zinc oxide, a zinc phosphate, a calcium silicate, an aluminum phosphate, a zinc calcium strontium aluminum orthophosphate silicate hydrate, a molybdate compound, a silicate compound, and/or a zinc phthalate compound. In various embodiments, the molybdate compound may be $ZnMoO_4$, $CaMoO_4$, and/or $MgMoO_4$. In various embodiments, the silicate compound may be $MgSiO_3$, $ZnSiO_3$, and/or $CaSiO_3$. A silicate compound comprising $MgSiO_3$ may be activated by heat treatment at a relatively lower temperature (i.e., activated at 260° C. (500° F.)), and/or may be activated by heat treatment at a relatively higher temperature (i.e., activated at 650° C. (1202° F.). In various embodiments, the zinc oxide, the zinc phosphate, the calcium silicate, the aluminum phosphate, and the zinc calcium strontium aluminum orthophosphate silicate hydrate, collectively, may comprise between 10% and 90% by weight of the corrosion inhibition composition. In various embodiments, the molybdate compound may comprise between 10% and 90% by weight of the corrosion inhibition composition. In various embodiments, the silicate compound may comprise between 10% and 90% by weight of the corrosion inhibition composition. In various embodiments, the zinc oxide, the zinc phosphate, the calcium silicate, the aluminum phosphate, and the zinc calcium strontium aluminum orthophosphate silicate hydrate, collectively, may comprise 33% by weight of the corrosion inhibition composition, the molybdate compound may comprise 33% by weight of the corrosion inhibition composition, and/or the silicate compound may comprise 33% by weight of the corrosion inhibition composition.

In various embodiments, the zinc phthalate compound may comprise a nitrophthalate zinc salt, such as zinc-5-nitroisophthalate, and/or a phthalic acid zinc salt. The zinc phthalate compound may comprise between approximately 0.001% and 5% by weight of the corrosion inhibition composition, wherein the term "approximately" in this context only refers to plus or minus 1% by weight. In various embodiments, the zinc phthalate compound may comprise between 3% and 4% by weight of the corrosion inhibition composition. In various embodiments, the zinc oxide, the zinc phosphate, the calcium silicate, the aluminum phosphate, and the zinc calcium strontium aluminum orthophosphate silicate hydrate, collectively, may comprise between 32% and 34% by weight of the corrosion inhibition composition, the molybdate compound may comprise between 32% and 34% by weight of the corrosion inhibition composition, and/or the silicate compound may comprise between 32% and 34% by weight of the corrosion inhibition composition.

In various embodiments, the corrosion resistant coating may comprise between 1% and 40% corrosion inhibition composition Pigment Volume Concentration (PVC), where PVC is defined as the ratio of the volume of corrosion inhibition composition over the volume of the corrosion resistant coating solids (i.e., the summation of the volumes of the corrosion inhibition composition and the application vehicle solid(s)):

$$PVC\ (\%) = \frac{\text{Volume of corrosion inhibition composition}}{\text{Volume of the corrosion inhibition composition}} \times 100$$
$$\text{plus volume of application vehicle solid(s)}$$

Figure 2:
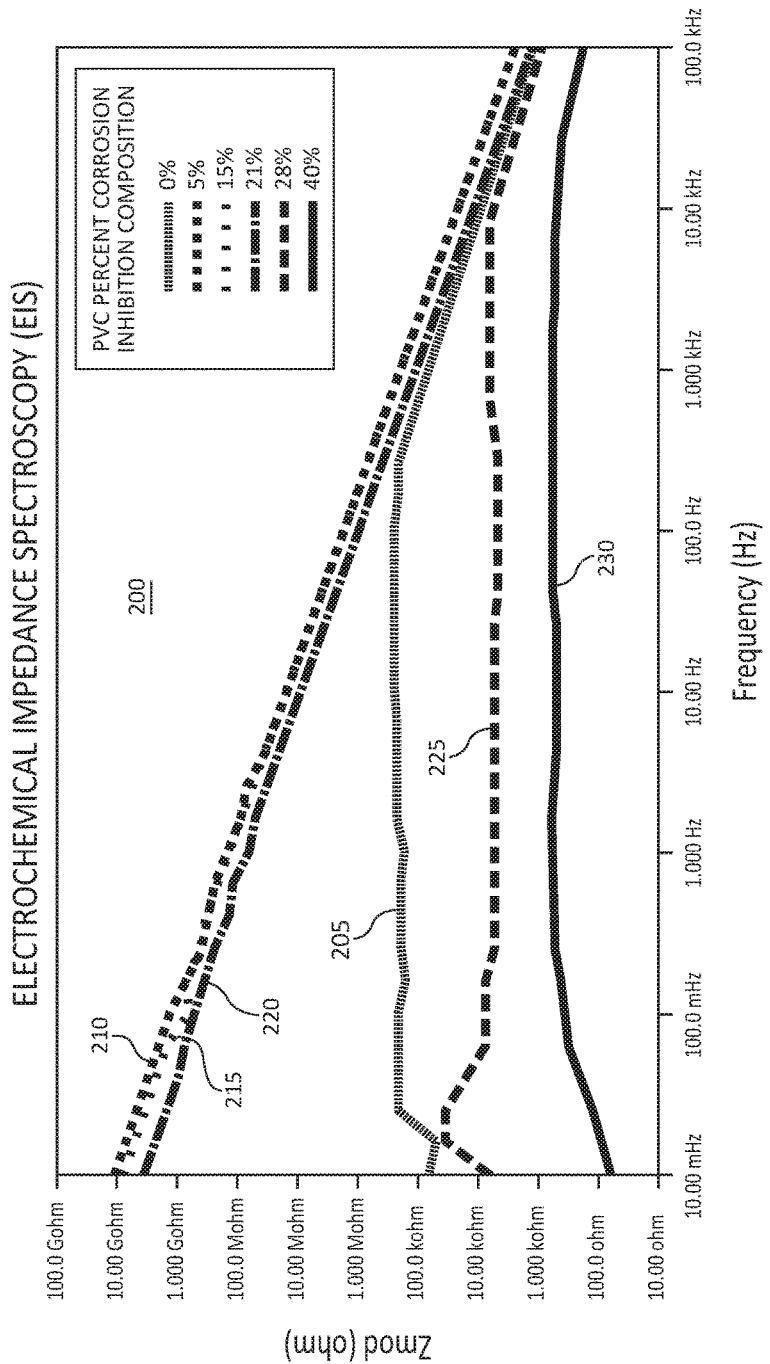
FIG. 2 illustrates electrochemical impedance spectroscopy data for varying PVC percentages of corrosion inhibition composition within a corrosion resistant coating, in accordance with various embodiments.

Referring to FIG. 2, plot 200 depicts electrochemical impedance spectroscopy (EIS) data for varying PVC percentages of corrosion inhibition composition within a corrosion resistant coating. The corrosion resistant coating was applied to TCP/ZiNi-plated steel in 350 ppm NaCl solution. The x-axis shows the frequency (Hz) of alternating current applied to the coated substrate test panel, and the y-axis shows the measured values of electrochemical impedance ($Z_{mod}$(ohm)), or the opposition to current. The greater the electrochemical impedance, the more effective the corrosion resistant coating may be at preventing corrosion. As depicted in FIG. 2, data plot 205 depicts data for a corrosion resistant coating comprising no corrosion inhibition composition (0% PVC). With the corrosion resistant coating comprising 0% PVC corrosion inhibition composition, the electrochemical impedance is approximately 200 kohm from 10 mHz to approximately 300 Hz, at which point the electrochemical impedance decreases substantially linearly. Data plot 210 depicts data for a corrosion resistant coating comprising 5% PVC corrosion inhibition composition, which shows a substantially linear decline starting from approximately 10 Gohm at 10 mHz and ending at approximately 1.00 kohm at 100 kHz. Data plots 215 and 220, depicting data from corrosion resistant coatings comprising 15% and 21% PVC corrosion inhibition composition, respectively, show trends similar to data plot 210. Data plots 225 and 230, depicting data from corrosion resistant coatings comprising 28% and 40% PVC corrosion inhibition composition, respectively, show electrochemical impedance values lower than plot 205 from 10 mHz to 100 kHz being applied to the solution. Accordingly, corrosion resistant coatings comprising between 5% and 21% PVC corrosion inhibition composition were found to be most effective at inhibiting current, which indicates that this PVC range provides the lowest coating porosity (thus better physical barrier properties) and is coatings are the most effective coatings at inhibiting corrosion.

In various embodiments, greater than 40% PVC corrosion inhibition composition within a corrosion resistant coating may cause the corrosion resistant coating to be too porous, and therefore, may not be able to effectively inhibit corrosion of a substrate. Less than 1% PVC corrosion inhibition composition within a corrosion resistant coating may result in a shortage of corrosion inhibiting material to prevent corrosion of the substrate. In various embodiments, a corrosion resistant coating may comprise between 5% and 21% PVC corrosion inhibition composition. In various embodiments, the corrosion resistant coating may comprise between 15% and 21% PVC corrosion inhibition composition.

As described above, one or more smart release adjuncts may be used in a corrosion resistant coating. The smart release adjunct aids in the solubility of the corrosion inhibition composition.

In various embodiments, a complexing agent (e.g., nicotinic acid or a salt of nicotinic acid) is used as smart release adjunct to increase the solubility of $ZnMoO_4/CaSiO_3$ pigments.

In various embodiments, an anion (e.g., the oxalate anion $C_2O_4^{2-}$ of $MgC_2O_4^{2-}$) is used as smart release adjunct to react with a targeted cation (e.g., $Zn^{2+}$), forming the less soluble $ZnC_2O_4$ thus increasing the solubility of $ZnMoO_4$/$ZnSiO_3$ pigments.

In various embodiments, $MgSiO_3$ combined with $ZnMoO_4$ is used as smart release adjunct with a corrosion inhibition composition.

With reference to FIG. 3, method 300 is illustrated. In step 302, a corrosion inhibition composition and an application vehicle may be combined to form a corrosion resistant coating. In various embodiments, a smart release adjunct may be combined with the corrosion inhibition composition and the application vehicle to form a corrosion resistant coating. The corrosion inhibition composition may comprise a zinc oxide, a zinc phosphate, a calcium silicate, an aluminum phosphate, a zinc calcium strontium aluminum orthophosphate silicate hydrate, a molybdate compound, a silicate compound, and a zinc phthalate compound. The zinc phthalate compound may comprise a nitrophthalate zinc salt and/or a phthalic acid zinc salt. In step 304, corrosion resistant coating may be painted or otherwise distributed or applied on a substrate and allowed to dry. For example, a corrosion resistant coating may be applied using a brush and/or roller. A corrosion resistant coating may also be applied by dipping or by spraying. Spraying may involve a pump style paint application system, with or without the use of air, to spray the corrosion resistant coating onto the substrate. In various embodiments, spraying may involve the use of a propellant, such as a volatile hydrocarbon, to pressurize the corrosion resistant coating and propel the corrosion resistant coating onto the substrate. Step 304 may be repeated one or more times to build one or more layers onto the substrate.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of disposing a corrosion resistant coating to a substrate, comprising:
    forming the corrosion resistant coating by combining a corrosion inhibition composition and an application vehicle; and
    applying the corrosion resistant coating to the substrate,
    wherein the corrosion inhibition composition comprises a zinc oxide, a zinc phosphate, a calcium silicate, an aluminum phosphate, a zinc calcium strontium aluminum orthophosphate silicate hydrate, a molybdate compound, a silicate compound, and a zinc phthalate compound.

2. The method of claim 1, wherein the zinc phthalate compound comprises at least one of a nitrophthalate zinc salt or a phthalic acid zinc salt.

* * * * *